US006485774B1

(12) United States Patent
Bransby

(10) Patent No.: US 6,485,774 B1
(45) Date of Patent: Nov. 26, 2002

(54) METHOD OF PREPARING AND HANDLING CHOPPED PLANT MATERIALS

(76) Inventor: David I. Bransby, 2668 Wire Rd., Auburn, AL (US) 36832

( * ) Notice: Subject to any disclaimer, the term of this patent is extended or adjusted under 35 U.S.C. 154(b) by 0 days.

(21) Appl. No.: 09/648,686

(22) Filed: Aug. 25, 2000

Related U.S. Application Data

(60) Provisional application No. 60/151,076, filed on Aug. 27, 1999.

(51) Int. Cl.$^7$ .................................................. A23K 3/02
(52) U.S. Cl. ....................... 426/623; 426/473; 426/636; 426/807
(58) Field of Search ................................ 426/623, 636, 426/473, 807

(56) References Cited

U.S. PATENT DOCUMENTS

| | | | | |
|---|---|---|---|---|
| 3,730,441 A | * | 5/1973 | Waldrop et al. | 241/60 |
| 3,738,796 A | * | 6/1973 | Arnold | 432/106 |
| 4,015,018 A | * | 3/1977 | Glabe et al. | 426/2 |
| 4,040,344 A | * | 8/1977 | Moore et al. | 100/95 |
| 4,059,233 A | * | 11/1977 | Dion | 241/47 |
| 4,742,671 A | * | 5/1988 | Bich | 56/15.9 |
| 5,219,825 A | * | 6/1993 | Greassel et al. | 504/117 |
| 5,736,176 A | * | 4/1998 | Gombos et al. | 426/54 |

FOREIGN PATENT DOCUMENTS

SU 1313390 * 5/1987

* cited by examiner

Primary Examiner—Chhaya D. Sayala
(74) Attorney, Agent, or Firm—Jondle & Associates PC

(57) ABSTRACT

The method improves efficiency of harvesting, storage, transport, and feeding of dry plant material to animals, and is a more efficient method for harvesting, handling and transporting dry plant material for industrial purposes, such as for production of bioenergy, and composite panels.

12 Claims, 1 Drawing Sheet

METHOD OF PREPARING AND HANDLING CHOPPED PLANT MATERIALS

CROSS-REFERENCE

This application is based on U.S. provisional application, Ser. No. 60/151,076 filed Aug. 27, 1999, incorporated by reference herein.

STATEMENT OF FEDERALLY SPONSORED RESEARCH OR DEVELOPMENT

Portions of this research were funded by a grant from the U.S. Department of Energy by way of Subcontract Number S98-07 between Southern Research Institute and Agtec Development LLC and pursuant to Cooperative Agreement Instrument Number DE-FC36-98GO10349 between Southern Research Institute and the U.S. Department of Energy and Agreement WO4603-05 between Southern Research Institute and the Electric Power Research Institute.

BACKGROUND

Current methods to harvest and handle switchgrass, other grasses, forages, fiber crops and crop residues for feeding to animals or use in industrial applications on a commercial scale involve conventional hay making procedures, including baling into big round bales. However, in order to facilitate feeding into an energy plant and efficient conversion to energy, bales need to be ground up into a particulate format. This is an energy-intensive operation that also requires control of particulate pollution. Also forage choppers are used for harvesting moist forage which has a moisture content greater than 40%, such as silage or haylage. A more efficient method of harvesting and handling grasses and forages when they are drier than this would result in lower cost and faster production.

DETAILED DESCRIPTION OF THE INVENTION

Figure 1:
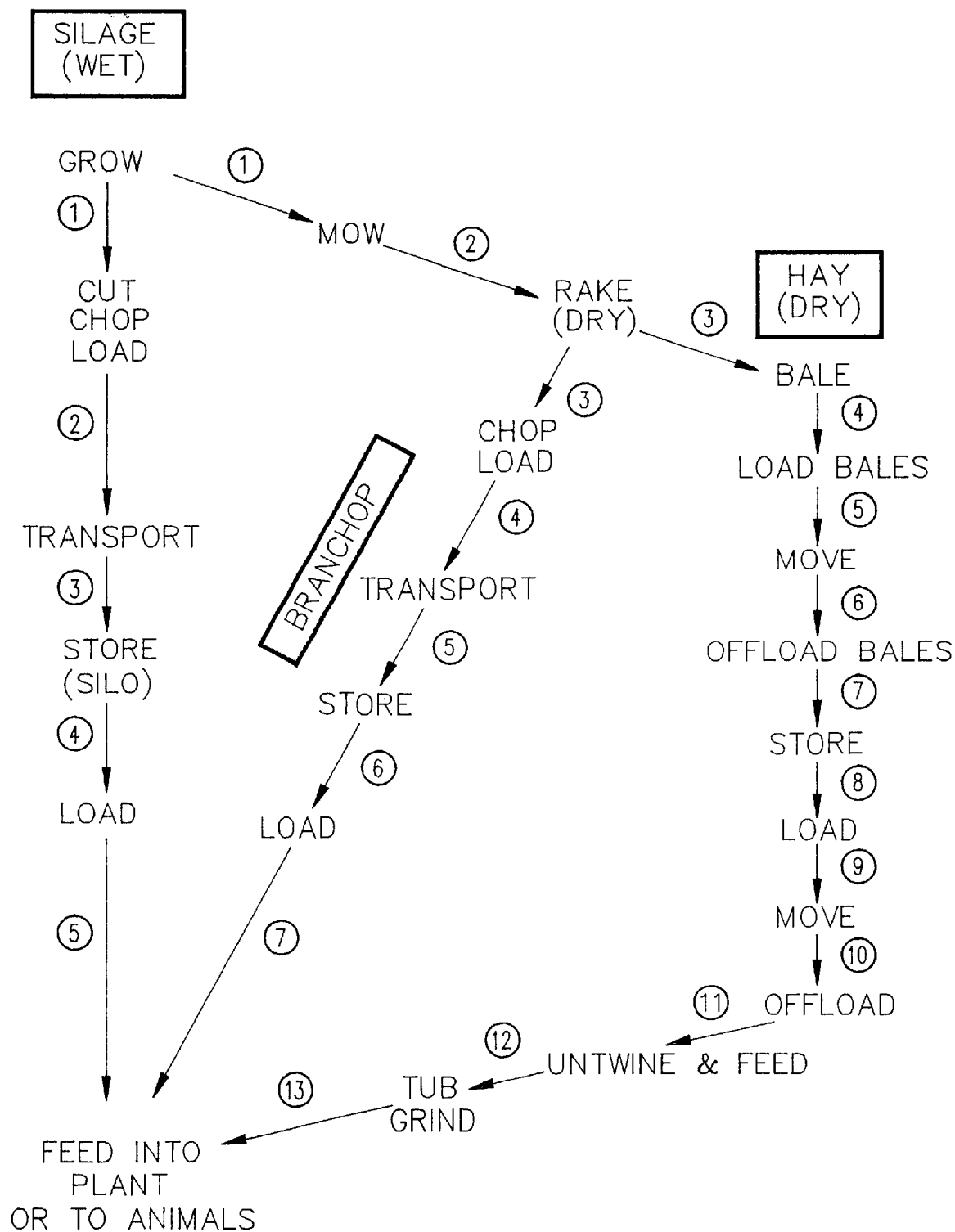
FIG. 1 shows a schematic diagram of the steps of one embodiment of the present invention, partially labeled as BRANCHOP™, compared with the other methods of preparing silage and baled hay.

The present invention improves efficiency of harvesting, storage, transport, and feeding of dry plant material to animals, and is a more efficient method for harvesting, handling and transporting dry plant material for industrial purposes, such as for production of bioenergy (electric power or biofuels), composite panels (such as particle board and oriented strand board) and pulp and paper.

Current methods to harvest and handle switchgrass for energy production on a commercial scale involve conventional hay making procedures, including baling into big round bales. However, in order to facilitate feeding into an energy plant and efficient conversion to energy, bales need to be ground up into a particulate format. This is an energy-intensive operation that also requires control of particulate pollution. Also forage choppers are used for harvesting moist forage having greater than 40% moisture content, such as silage or haylage, but prior to the present invention there have been no successful attempts at field chopping to harvest and handle dry herbaceous material. Prior to the present invention, no research was done to determine the bulk density of dry, chopped plant material, and therefore, determining the amount that can be transported in a truck, and the associated transport costs. Also, no research was done to determine how best to store dry, chopped material. The present invention involves a method of field chopping as an alternative to baling for harvesting and handling dry plant material for use as animal feed or industrial raw material. In one embodiment, switchgrass was successfully mown with a mower-conditioner, picked up and chopped with a pull-behind forage chopper after it had dried to less than 20% moisture in the windrow, and then was stacked in a pile with a front-end loader. The pile of chopped switchgrass shed rain water due to a thatching process, and therefore did not need artificial protection or additional protection from rain. A front-end loader with a large scoop took about 30 minutes to load 13 tons of chopped switchgrass onto a 45 foot walking floor trailer, which offloaded the cargo in about 20 minutes. Therefore, the method of the present invention is an improved method compared to baling for harvesting and handling switchgrass.

One aspect of the process of the instant invention is to improve on the current hay making process for preserving and feeding forage. In other aspects and embodiments, the process of the present invention is used to improve the production, transport and utilization of herbaceous material as: 1) mulch (either in the field where it is harvested, or elsewhere); 2) animal bedding, (such as for horses and in chicken houses); 3) growing medium (such as for mushrooms); 4) as a bioenergy feedstock; and, 5) industrial purposes (such as for construction of composite panels like particle board and oriented strand board, pulp and paper, insulation board and the like).

In one embodiment of the invention the first two steps of this new process are the same as currently used for regular hay making—1) mowing and 2) raking for regular field drying of the herbage. However, instead of baling the herbage once it is dry, in the process of the present invention the plant material is picked up directly from the windrow with a chopper, such as a forage chopper or a silage chopper, and then blown directly into a wagon or truck behind or beside the chopper. In another embodiment the standing plant material is dry enough to cut, chop and blow directly into a collection vehicle in one operation. Clearly, this method eliminates the need (and cost) of mowing and raking. The need to mow and rake is also eliminated by using desiccants such as paraquat or Gramoxone to dry the standing crop. Another advantage of the chopping step of the present invention is using a chopper to harvest and store herbage at a higher herbage moisture content versus baling, because additional drying takes place during the chopping and blowing process. Chopping was also faster than baling, because there was no time needed for wrapping or twining the bales, and the forage chopper harvested the plant material faster than balers. Finally, there was less loss from leaf shatter with chopping because balers cause a lot of leaf shatter when the bale is being rotated and wrapped or twined.

The method of the present invention allows on-farm transport of chopped herbage which was quicker than using bales because the chopped herbage can be done in larger loads than for bales. Also the instant invention is linked directly to the chopping operation, and was not done afterwards, as for baling, which requires a tractor and truck, or wagon to move from bale to bale for individual pick up. If chopped material is fed to animals from the stack where it is stored, the chopped material can be taken directly to the feeding site versus bales which are usually moved to a storage site first, then moved again when fed.

The chopped herbage of the present invention was handled, loaded and moved with a front-end loader, and various types of blowers, such as those used to handle wood chips or forest product residues e.g., sawdust and bark. The chopped herbage was also suitable for movement on a conveyer belt, and with other types of automated equipment such as screw augers. This equipment is known and readily available, but opportunities do exist to develop new equipment designs to make the process more efficient. Unlike bales, chopped herbage can also be tipped off trucks or wagons versus bales which cannot be dumped because they may break. Hence, handling options for chopped hay are much more flexible and are considerably faster than for bales. Furthermore, with the chopped herbage of the present invention there is no need for twine, which often fouls machinery in the field and processing plant. Chopped herbage can also be baled if necessary, provided particle size is suitable, or it can be formulated into modules, such as with a cotton module builder.

Another aspect of the present invention is that the chopped hay or herbage can be transported in the same way that wood chips, wood shavings, bark and other forest product residues are transported in closed or open top trucks and containers which have sides. These chopped herbaceous materials do not require special permits, as do oversize loads of hay bales. Again, the chopped hay of the present invention is loaded with front-end loaders or blowers, and offloaded by dumping or tipping. This makes these operations quicker than when using bales. Chopped herbage allows a greater weight to be transported per load than bales in vehicles or containers with sides, including barges and rail cars. Unexpectedly, as shown in Table 1, the weight depends on the fineness of chop which strongly affects bulk density, i.e., the smaller the particle size, the greater the bulk density. The decrease in particle size shown in Table 1 increased bulk density, and therefore, the amount of material that can be loaded onto a truck by 18.4%, 25.7% and 20.5%, for bermuda grass, switchgrass and alfalfa, respectively. The extent of this increase was very unexpected. If formulated into modules with cotton module builders, this facilitates easy transport with cotton module trucks and allows efficient use of this cotton equipment outside the normal two-month cotton harvesting period.

TABLE 1

Effect of course (0.1875 inch screen) and fine (0.09375 inch screen) grinding on bulk density (lb/cubic ft) of bermuda grass, switchgrass and alfalfa.

| Plant Species | Course lb/cubic ft | Fine | % Change |
|---|---|---|---|
| Bermuda grass | 6.79 | 8.04 | 18.4 |
| Switchgrass | 8.72 | 10.96 | 25.7 |
| Alfalfa | 10.03 | 12.09 | 20.5 |

In another aspect of the invention, the chopped herbage results in lower storage losses versus using bales, even when the chopped herbage is stored in a pile exposed to the weather. In such a case, provided the pile has sloping sides, the surface thatches and water mostly runs off instead of penetrating, thus leaving the interior relatively dry. Because of the low surface area to volume ratio of a pile of chopped herbage, compared to bales, it is cheaper to cover with plastic than bales are, and it uses space in buildings more efficiently than bales. Furthermore, the chopped plant material can be stored in upright silos (or haylos), which is not possible for bales. If stored in compressed modules, these are subject to relatively little weather damage, regardless of whether they are covered or not.

If the end use requires that herbage be in particulate form, the bales need to be chopped, usually with a tub grinder. This can be an expensive piece of equipment and the process can be slow, and is energy-intensive. The process of the present invention reduced processing and eliminated the need for this extra equipment. Chopped herbage is required for feedlot and dairy rations (because long unchopped hay will not mix with concentrate feeds), mulch, animal bedding, industrial uses and as a mushroom growth medium.

The chopped herbage of the present invention is more flexible than bales for feeding to animals and can be self-fed from a stack. Animals can feed themselves directly from the stack from behind a movable rail barrier which limits wastage and which is similar to the way silage is fed from a trench silo. Also, chopped herbage can be placed in a feeding bunk, or fed in self-feeders with large storage bins that automatically fill the bunks as the feed is consumed by animals. Chopped hay also allows hays of different quality to be blended to get a mixture of desired quality, while this possibility is not available with bales. With chopped hay there will be less feeding wastage than with long hay which tends to get dragged out of the bale, dropped on the ground and subsequently fouled by trampling or excreta. Chopping also increases digestibility and consumption.

Chopped herbage feeds well into industrial plants, and mixes well with other industrial ingredients. With current procedures industries that use chopped herbage as a raw material usually use tub grinders for chopping bales, and this causes severe particulate pollution which is unacceptable in urban areas. The process of the present invention decentralizes such pollution by keeping it on the farm.

The method of the present invention has unique combinations of process components and steps which resulted in major improvements in overall energy and economic efficiency. Direct chopping of the dry herbage as it is picked up in the field, instead of baling has important advantages. If chopped herbage is required for end use, this reduces the two process components of baling and grinding to one. Furthermore, since chopped hay is more economic than baling, chopped hay will likely replace some baled, long hay which is the only option that is economically feasible at the present time. The "thatching" effect of the chopped hay of the present invention, unexpectedly resulted in limited moisture penetration and reduced spoilage in piles of chopped herbage exposed to the weather which was not previously known. This is a valuable feature which has been researched and documented quantitatively. Also, as shown in Table 2, the high bulk density of chopped herbage is a very valuable feature of the process of the present invention because it facilitates economic transport of the plant material. Transport costs for bales are approximately double those for chopped herbage, as shown in Table 2.

TABLE 2

Cost per ton of harvesting and transporting switchgrass by using field chopping or big round bales.

| Activity | Chopping | Baling | % Difference |
|---|---|---|---|
|  | Dollars |  |  |
| Harvesting | 7.89 | 11.56 | 19.45 |
| Transport | 43.52 | 87.04 | 100.00 |
| Total | 51.41 | 98.60 | 91.79 |

Assuming a yield of 5 tons/acre and 100 miles of hauling.

EXAMPLES

The following examples are provided to further illustrate the present invention and are not intended to limit the invention beyond the limitations set forth in the appended claims.

Example 1

Previous harvest methods involve baling after mowing, or raking, and feeding bales directly to animals or hauling the bales to an industrial plant.

There are numerous disadvantages to the baling process compared to the method of the instant invention (also called the Branchop™ Process). Additional steps are involved with baled hay which requires more time, energy and expense. After baling, the bales are scattered across the field and need to be picked up, whereas, after chopping the chopped herbage is in a single pile since once the silage wagon is full, it is dumped into a pile. These bales have to be loaded individually onto trailers or trucks while the chopped herbage is blown onto a wagon. Bales have to be individually removed from the trailers or trucks to avoid breaking the bale versus chopped herbage which can be dumped.

When long hay is fed to animals in bales, there is approximately 50% wasted versus chopped hay which has wastage which is less than 10%. Also, bales of low and high quality hay cannot be blended but piles of low and high quality chopped hay can be blended.

Bales are cumbersome, weighing 1200 pounds and measuring 5 feet wide. When they are placed side by side on a flatbed trailer, an oversize load permit for road transportation are necessary. Bales need to be strapped onto trailers which takes additional time. Due to the weight and size of bales, a dangerous situation occurs when loading and unloading bales, such as if a bale falls on an individual.

To properly protect bales from rain, each bale needs to be individually wrapped in plastic which takes much more time and expense than covering a pile of chopped hay with plastic.

Long hay is less digestible and palatable than chopped hay and thus animal intake is lower.

Bales cannot be stored in upright silos while chopped hay can. If chopped herbage is needed from bales, the bales need to be ground with a tub grinder or hammer mill which requires more energy, equipment, time and expense. If grinding takes place at an industrial plant in an urban area, particulate pollution needs to be controlled. Field chopping keeps this type of pollution dispersed on farms.

Example 2

After mowing and raking a 120-acre switchgrass field at Lincoln, Ala., in August, 1999, (in which the yield was about 3 tons of dry matter per acre) the hay was either: 1) baled with a big (6 ft diameter×5 ft wide) round bales, or 2) chopped with a pull-behind forage chopper. After baling, each bale was loaded onto a trailer individually, and bales were then transported to the edge of the field where they were offloaded individually. In contrast, chopped material was blown directly into a high dump silage wagon while chopping. Whenever the wagon was full it was hauled to the edge of the field and dumped out onto a pile.

Consequently, the bale operation initially required a tractor pulling a big round baler for baling, and subsequently needed a tractor with a spear to load and offload bales, as well as a truck and trailer to transport bales to the edge of a field, and drivers for both the tractor and the truck. Furthermore, both the tractor and the trailer had to travel back and forth from picking the bales up in the field to the offloading site at the edge of the field. Several bales were then ground with a tub grinder to produce chopped hay and the time needed for this process was recorded. In contrast, the field chopping method of the present invention required only the tractor pulling the chopper and silage wagon in a single rig, and the silage wagon was hauled to the edge of the field and dumped out whenever it was full. The labor minutes per ton were recorded for each component of the two procedures, and are presented in Table 3.

TABLE 3

Labor minutes per ton for the field chopping method of the present invention versus round baling, and moving material to a storage site at the edge of the field.

|  | Chopping | Baling |
|---|---|---|
|  | (Minutes) | |
| Chopping or baling | 3.63 | 2.51 |
| Hauling to edge of field | 3.00 | 1.68 |
| Dumping | 0.60 | — |
| Loading and offloading bales | — | 4.62 |
| Sub-total | 7.23 | 8.81 |
| Tub grinding | — | 13.84 |
| TOTAL | 7.23 | 22.65 |

To make bales and store them at the edge of the field took 22% more labor time than chopping and dumping chopped material in a pile at the edge of the field. However, tub grinding was very slow because the tub grinder had to be fitted with a half inch screen to achieve the same particle size as that achieved by chopping. This resulted in a total of 213% more time for the baling/grinding procedure than for chopping. If labor is priced at $20.00/hour, then this amounts to $2.41/ton for chopping and $7.55/ton for baling and tub grinding.

Example 3

It took 91 minutes to load 26 big round bales weighing 1,218 lb of dry matter each onto a 42-foot flat bed trailer and strap them on, and 56 minutes to offload them. In contrast, using the method of the present invention, it took 32 minutes to load 12.46 dry tons (determined by weighing the truck before and after loading on a truck scale, and sub-sampling for determining moisture content) of chopped switchgrass into a 45-ft walking floor trailer, and 19 minutes to offload. This resulted in a loading and offloading time of 9.29 minutes/ton for bales, and 4.09 minutes per ton for chopped material.

Example 4

Five samples of field-chopped switchgrass were taken from a pile which had been formed during the operation described in Example 2. Sub-samples were weighed before and after drying to constant weight in a forced air oven to determine moisture content. Other sub-samples were placed in a 0.35 ft$^3$ container to determine bulk density.

Average dry matter content of the five samples was 93.6% (standard deviation=0.61; CV % =0.65), and the moisture content was 6.4%. Standard big round bales are 6 ft in diameter and 5 ft wide. Bales of switchgrass this size typically weigh around 1,200 lb at 12% moisture, or contain around 1,056 lb of dry matter. Because there are 141.4 cubic feet in a bale, this amounts to a bulk density of 7.47 lb/ft$^3$. Surprisingly, without any forced compaction, the average bulk density of the five chopped air dry switchgrass samples was 8.30 lb/ft$^3$ (standard deviation=0.58; CV % =7.0). Given that the moisture content was 6.4%, this converts to a bulk density of 7.77 lb/ft$^3$ of dry matter, which is slightly higher than that of a 1,200-lb bale at 12% moisture.

This estimate corresponds very closely with the records from Example 2; the 45×9×8 ft trailer held 24,920 lb of dry material in 3,240 ft$^3$, which amounts to a bulk density of 7.69 lb/ft$^3$. Furthermore, it indicates that a 53×8.5×9.5 ft trailer holds approximately 16.45 tons of dry matter.

There are several machinery modifications which improved the process of the present invention: 1) Harder blades reduce the current necessity for frequent blade sharpening. This is caused by the material being dry (<40% moisture), instead of wet like silage (65% moisture) and haylage (45% moisture); 2) Guards are needed to funnel the dry, light material into the collection truck or wagon, and to prevent it from being blown away; 3) The drum on which the blades are mounted could be geared up to turn faster, thus producing smaller particles and a higher bulk density. (This would lead to cheaper transport.); 4) More blades can be added to the drum, thus achieving the same result as in 3) above.

Example 5

Switchgrass harvest budget for large round bales are shown in Table 4.

TABLE 4

| ITEM | UNITS | QUANTITY/ ACRE | PRICE OR COST/UNIT | TOTAL COST |
|---|---|---|---|---|
| VARIABLE COSTS | | | | |
| Tractor & equipment | Acre | 1.00 | $15.06 | $15.06 |
| Total Variable Costs | | | | $15.06 |
| FIXED COSTS | | | | |
| Tractor & equipment | Acre | 1.00 | $17.85 | $17.85 |
| General overhead | Dol. | 15.06 | 7% | 1.05 |
| Total Fixed Costs | | | | $18.90 |
| OTHER COSTS | | | | |
| Labor (wages & benefits) | Hour | 3.67 | $6.50 | $23.83 |
| Total Other Costs | | | | $23.83 |
| TOTAL OF ALL COSTS | | | | $57.79 |

Example 6

Switchgrass harvest budget for chopped plant material using the method of the present invention is shown in Table 5.

TABLE 5

| ITEM | UNITS | QUANTITY/ ACRE | PRICE OR COST/UNIT | TOTAL COST |
|---|---|---|---|---|
| VARIABLE COSTS | | | | |
| Tractor & equipment | Acre | 1.00 | $13.86 | $13.86 |
| Total Variable Costs | | | | $13.86 |
| FIXED COSTS | | | | |
| Tractor & equipment | Acre | 1.00 | $16.33 | $16.33 |
| General overhead | Dol. | 13.86 | 7% | .97 |
| Total Fixed Costs | | | | $17.30 |
| OTHER COSTS | | | | |
| Labor (wages & benefits) | Hour | 1.28 | $6.50 | $8.31 |
| Total Other Costs | | | | $8.31 |
| TOTAL OF ALL COSTS | | | | $39.47 |

Example 7

Switchgrass transportation budget for large round bales is shown in Table 6.

TABLE 6

| ITEM | UNITS | QUANTITY/ ACRE | PRICE OR COST/UNIT | TOTAL COST |
|---|---|---|---|---|
| VARIABLE COSTS | | | | |
| Harvest cost (1 or 2) | Acre | 1.00 | $57.79 | $57.79 |
| Tractor & equipment | Acre | 1.00 | 156.80 | $156.80 |
| Total Variable Costs | | | | $214.59 |
| FIXED COSTS | | | | |
| Tractor & equipment | Acre | 1.00 | $68.01 | $68.01 |
| General overhead | Dol. | 214.59 | 7% | 15.02 |
| Total Fixed Costs | | | | $83.03 |
| OTHER COSTS | | | | |
| Labor (wages & benefits) | Hour | 21.17 | $6.50 | $137.59 |
| Total Other Costs | | | | $137.59 |
| TOTAL OF ALL COSTS | | | | $435.21 |

Example 8

Switchgrass transportation budget for loose chop plant material using the method of the present invention is shown in Table 7.

TABLE 7

| ITEM | UNITS | QUANTITY/ ACRE | PRICE OR COST/UNIT | TOTAL COST |
|---|---|---|---|---|
| VARIABLE COSTS | | | | |
| Harvest cost (1 or 2) | Acre | 1.00 | $39.47 | $39.47 |
| Tractor & equipment | Acre | 1.00 | 77.35 | $77.35 |
| Total Variable Costs | | | | $116.82 |
| FIXED COSTS | | | | |
| Tractor & equipment | Acre | 1.00 | $41.28 | $41.28 |
| General overhead | Dol. | 116.82 | 7% | 8.18 |
| Total Fixed Costs | | | | $49.45 |
| OTHER COSTS | | | | |
| Labor (wages & benefits) | Hour | 7.9 | $6.50 | $51.32 |
| Total Other Costs | | | | $51.32 |
| TOTAL OF ALL COSTS | | | | $217.60 |

Although the foregoing invention has been described in some detail by way of illustration and example for purposes of clarity and understanding, it will be obvious that certain changes and modifications may be practiced within the scope of the invention, as limited only by the scope of the appended claims.

What is claimed is:

1. A method of producing chopped material comprising the sequential steps of:

a) growing plants;

b) allowing said plants to dry to less than 40 percent moisture to produce dry plant material; and c) chopping said dry plant material to produce a chopped plant material.

2. The method of claim 1, wherein said growing plants are dried using a desiccant.

3. The method of claim 2, wherein said desiccant is selected from the group consisting of paraquat.

4. The method of claim 1 wherein said plant is a grass or forage crop.

5. The method of claim 1, wherein said plant is switchgrass.

6. The method of claim 1, wherein said percent moisture is between about 30% and about 40%.

7. The method of claim 1, wherein said percent moisture is between about 20% and about 29%.

8. The method of claim 1, wherein said percent moisture is between about 10% and about 19%.

9. The method of claim 1, wherein said percent moisture is between about 2% and about 9%.

10. The method of claim 1, wherein said plant is a fiber crop.

11. The method of claim 1, wherein said plant is a grain crop.

12. The method of claim 1, wherein said dry plant material is produced from crop residue.

* * * * *